United States Patent
Orlandi

[11] Patent Number: 5,884,653
[45] Date of Patent: Mar. 23, 1999

[54] PISTON-TYPE DEVICE TO REGULATE PRESSURE

[75] Inventor: Alessio Orlandi, Castiglione Delle Stiviere, Italy

[73] Assignee: Galatron SRL, Delle Stiviere, Italy

[21] Appl. No.: 741,198

[22] Filed: Oct. 29, 1996

[30] Foreign Application Priority Data

Nov. 3, 1995 [IT] Italy ............................ UD95 A 000219

[51] Int. Cl.⁶ ..................................................... G05D 11/03
[52] U.S. Cl. ............................................ 137/100; 251/284
[58] Field of Search ....................... 137/98, 100; 251/284

[56] References Cited

U.S. PATENT DOCUMENTS

| | | | |
|---|---|---|---|
| 3,192,939 | 7/1965 | Moen | 137/100 |
| 4,469,121 | 9/1984 | Moen | 137/100 |
| 4,926,897 | 5/1990 | Perrott | 137/98 |
| 5,299,593 | 4/1994 | Ottelli | 137/100 |

FOREIGN PATENT DOCUMENTS

| | | |
|---|---|---|
| 559998 | 9/1993 | European Pat. Off. . |
| 2652539 | 6/1977 | Germany . |

*Primary Examiner*—Stephen M. Hepperle
*Attorney, Agent, or Firm*—Stevens, Davis, Miller & Mosher, L.L.P.

[57] ABSTRACT

Piston-type device to regulate pressure in mixing valves, advantageously of the cartridge type, comprising at least an outer containing body (11) with separate inlet holes (15a, 15b) and outlet holes (21a, 21b) for hot and cold water and containing inside a floating piston with apertures on the circumference which can be associated in a variable manner with the inlet holes (15a, 15b), the lateral contact surfaces of the floating piston (14) on the two sides being defined by ribs (19) obtained radially on the outer containing body (11) and extending towards the inside of the regulator device (10), the ribs (19) defining a contact surface at least reduced in relation to the front surface of the floating piston (14).

4 Claims, 1 Drawing Sheet

PISTON-TYPE DEVICE TO REGULATE PRESSURE

FIELD OF INVENTION

This invention concerns a piston-type device to regulate pressure in mixing valves as set forth in the main claim. To be more exact, the device according to the invention is applied in general in cartridge-type mixing valves of hot/cold water and is used to balance and equalise the outlet pressures of the two different types of water according to their different pressures of feed.

BACKGROUND OF THE INVENTION

The state of the art includes cartridge-type mixing valves which have a normally cylindrical cartridge body containing inside those functional elements to supply and restrict the hot and cold water to be mixed and delivered.

The cartridge body normally comprises a lower wall, or closure element, with two inlet holes, respectively associated with the supply pipes of the hot and cold water, and an outlet hole for the mixed water.

The different rates of flow of the water being fed are regulated by activating, by means of a lever, two plates, one stationary and the other movable, in such a way as to reduce or increase the apertures of the respective holes.

One of the most common disadvantages found in these mixing valves derives from the difference between the pressure, and therefore the flow, of delivery of the hot water and the cold water.

This difference in pressures derives from the different delivery points of the supply system from which the two types of water are supplied, and of the consequent different losses in load factor along the relative supply pipes.

In the more up-to-date mixing valves, the state of the art therefore includes, at the inlet to the mixing valve, an equalising device to equalise the two different pressures, thus making it possible to obtain at the outlet rates of flow of hot water and cold water substantially of the same entity.

One type of pressure regulator normally used in the state of the art includes a body, interposed between the supply pipes and the mixing valve and having the relative water inlet and water outlet holes, inside which there is a floating piston which moves towards one side or the other according to the differences in pressure with which the two types of water are supplied by the water supply system.

This movement of the floating piston causes an increase or a reduction in the inlet aperture of the feed channels of the water so that, when there is a condition of equal pressures and therefore the floating piston is stable, the two rates of flow delivered to the mixing valve are substantially equal.

In regulator devices known to the state of the art, it happens that at the end of its travel, both on one side and the other, the floating piston rests substantially with all its front surface on the wall of the body inside which it is contained.

This causes considerable imbalances in the thrust value acting on the piston, as this thrust is obtained as a product of the pressure and the surface.

A solution to this problem has been proposed in EP-A-599.998, which includes slots on the front walls of the piston.

This solution however does not resolve the problem in a satisfactory manner, as it causes difficulties in the working, imprecise regulation, possible imbalances and irregularities in the movement of the piston and other disdvantages.

SUMMARY OF THE INVENTION

The preset applicants have designed, tested and embodied this invention to overcome the shortcomings of the state of the art, and also to achieve further advantages.

The purpose of the invention is to obtain a piston-type pressure regulator device in a mixing valve which is suitable to at least reduce the problems deriving from the imbalances of the thrust forces exerted on the two sides of the piston.

The regulator device according to the invention comprises a floating piston inserted inside a containing body with inlet and outlet holes for the hot and cold water.

The containing body is inserted between the relative delivery pipes for the water and the mixing valve.

According to the invention, the side contacts between the floating piston and the containing body are achieved by means of ribs solid on the body itself, which extend radially towards the centre of the regulator.

This solution, which on one hand makes it possible to reduce the length of the floating piston, on the other hand guarantees the considerable advantage that the contact surface, in both positions at the end of travel, is made to be extremely reduced.

This makes it possible to considerably reduce imbalances resulting from the difference between the surfaces on which the water pressure acts at the positions of the end of travel of the floating piston.

Another advantage of this configuration is that the presence of the lateral contact ribs defines pre-chambers for the water outlet inside the containing body itself, ensuring a better regulation of the outlet flow.

This solution, compared with regulators known to the state of the art, moreover makes it possible to reduce the number of sealing elements and of the mechanical workings both on the containing body and on the floating piston.

The attached figures are given as a non-restrictive example and show a preferred solution of the invention as follows:

DETAILED DESCRIPTION OF THE PREFERRED EMBODIMENTS

Figure 1:
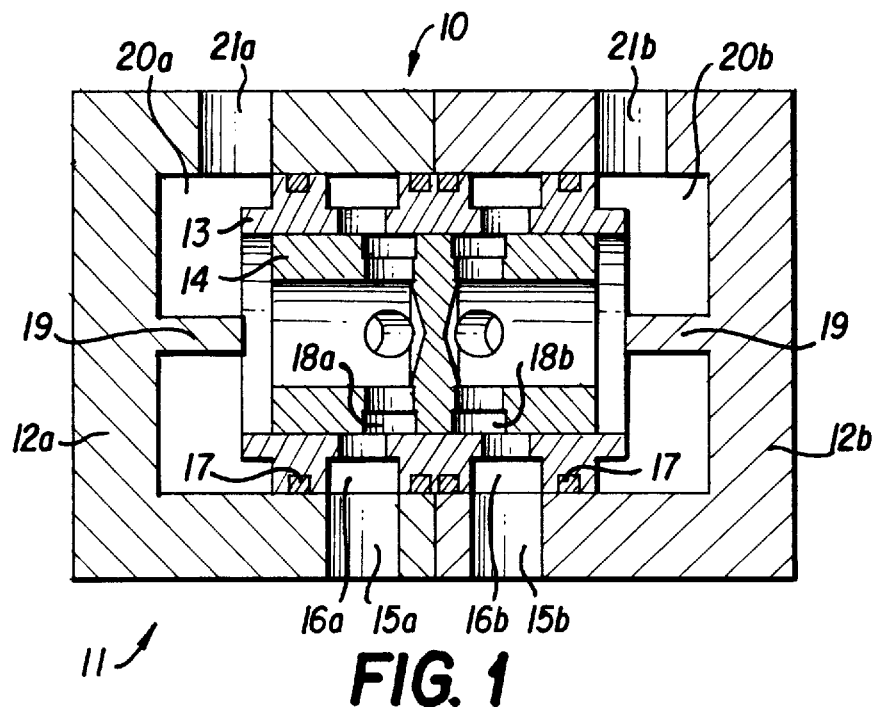
FIG. 1. shows the pressure regulator device according to the invention with the floating piston in its position of balance.
Figure 2:
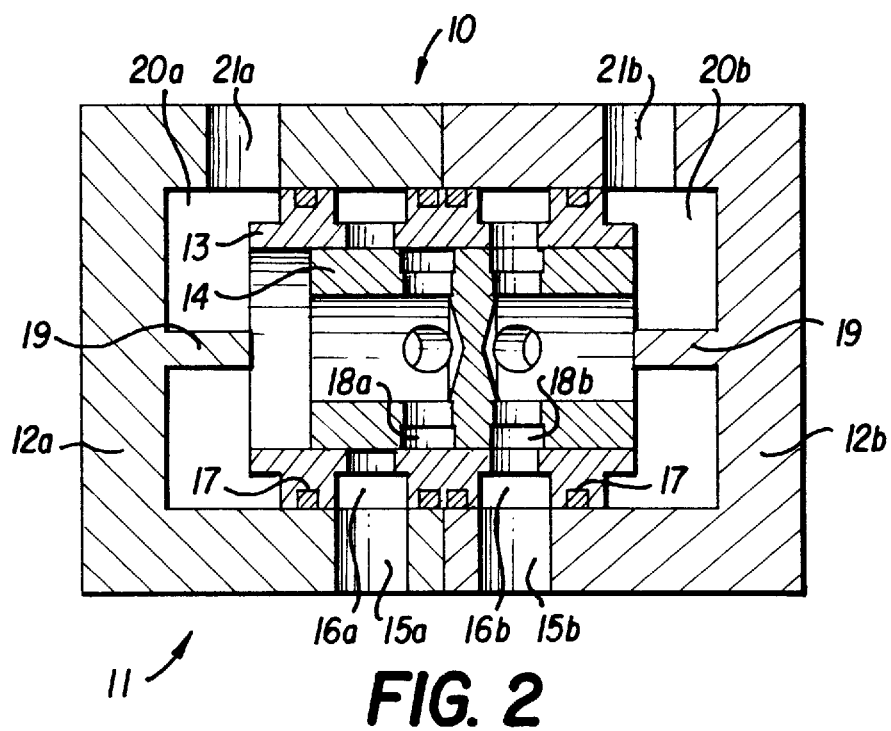
FIG. 2. shows the device shown in FIG. 1 with its floating piston in an end-of-travel position.

The pressure regulator device 10 according to the invention is shown in two working positions respectively in FIGS. 1 and 2.

The device 10 is associated in this case at the lower part with the supply pipes (not shown here) of hot and cold water and at the upper part with a cartridge type mixing valve (not shown here).

The device 10 comprises a substantially cylindrical outer containing body 11, in this case defined by two half-bodies 12a and 12b, and an inner containing body 13 inside which there is the floating piston 14.

The outer containing body 11 has first holes 15a and 15b for the intake of hot and cold water, the holes being able to be associated with the relative pipes of the water supply system.

The inner containing body 13 has similar second holes 16a, 16b mating with the first holes 15a, 15b.

The first and second holes are surrounded by water-tight sealing elements 17.

The floating piston 14 has circumferential transit holes, respectively 18a and 18b, facing the second holes 16a, 16b, whose aperture can be varied according to the position of the floating piston 14 with respect to the inner containing body 13.

According to the feed pressures of the hot and cold water, the floating piston 14 moves sideways from one-side or the other and varies the aperture so as to ensure a substantial balance of the water pressures being delivered at the outlet.

In this case, the lateral contacts of the floating piston 14 are obtained by means of ribs 19 on the outer containing body 11 which extend radially towards the inside of the regulator device 10.

The presence of these ribs 19 causes, on both sides, a considerable reduction in the entity of the contact surfaces between the floating piston 14 and the outer containing body 11, thus limiting problems of imbalance of the forces of thrust mentioned above.

Moreover, the length of the floating piston 14 is also considerably reduced, with the same lateral travel.

The radial ribs 19 define, for each side, water outlet pre-chambers, respectively 20a and 20b connected to the outlet holes, respectively 21a and 21b, which connect the regulator device 10 with the mixing valve.

These water outlet pre-chambers 20a, 20b make it possible to regulate the outlet flow, reducing at the same time the mechanical workings on the floating piston 14 and on the containing bodies 11 and 13, as well as limiting the number of sealing elements 17 in the regulator device 10.

I claim:

1. A piston-type pressure regulator device for a cartridge mixing valve, said pressure regulator device comprising: at least an outer containing body (11) with separate inlet holes (15a, 15b) and outlet holes (21a, 21b) for hot and cold water, the outer containing body having two opposed internal sides, a floating piston having two opposed front surfaces and having circumferential apertures for associating in a variable manner with the inlet holes (15a, 15b), the outer containing body (11) containing the floating piston, wherein lateral contact surfaces opposing, respectively, the two front surfaces of the floating piston (14) are defined by ribs (19) made radially on the opposed inner walls of the outer containing body (11) and extending towards the inside of the regulator device (10), each of the ribs (19) defining a contact area which is less than the area of the respective front surface of the floating piston (14).

2. A regulator device as in claim 1, in which the ribs (19) define water outlet pre-chambers (20a, 20b) associated with the respective outlet holes (21a, 21b).

3. A regulator device as in claim 1, wherein the floating piston (14) has a length less than that of a standard floating piston, in a conventional standard size outer containing body, having the same lateral travel.

4. A regulator device as in claim 2, wherein the floating piston (14) has a length less than that of a standard floating piston, in a conventional standard size outer containing body, having the same lateral travel.

* * * * *